(No Model.)

P. QUITMAN.
DEVICE FOR ADMINISTERING MEDICINE TO ANIMALS.

No. 403,213. Patented May 14, 1889.

Witnesses:

Inventor:
Philip Quitman,
By Dyrenforth & Dyrenforth
Attys.

UNITED STATES PATENT OFFICE.

PHILIP QUITMAN, OF CHICAGO, ILLINOIS.

DEVICE FOR ADMINISTERING MEDICINE TO ANIMALS.

SPECIFICATION forming part of Letters Patent No. 403,213, dated May 14, 1889.

Application filed August 21, 1888. Serial No. 283,359. (No model.)

*To all whom it may concern:*

Be it known that I, PHILIP QUITMAN, a citizen of the United States, residing at Chicago, in the county of Cook and State of Illinois, have invented a new and useful Appliance for Administering Medicine to Animals, of which the following is a specification.

Much difficulty is experienced by veterinary surgeons and others in the proper administration of certain medicines to animals. In the case, for example, of administering condition-powders to horses the common practice heretofore has been, instead of giving them between the times of feeding, to mix them with the food of the animal. This, however, is not a rational practice. It is seldom, if ever, employed in the administration of medicine to human beings, and is chiefly employed in the case of horses for the sake of facility. One objection to the practice is that the same cause which renders condition powders advisable frequently operates to destroy the appetite of the horse, and in refusing the food the animal refuses the medicine. Another objection is, that effective condition-powders, and medicines generally, cannot be made palatable to an animal, and when mixed with food they tend to cause it to reject what it would otherwise eat; nor are they, as a rule, as efficacious when taken with food as when taken alone. In addition to this, little reliance can be placed upon the average groom or hostler in the matter of administering medicines regularly and judiciously, thus throwing into the medical treatment of domestic animals another element of uncertainty.

My invention relates to a new and improved appliance for administering certain medicines to domestic animals, whereby the above difficulties are overcome.

My appliance is not applicable to the administration of all medicines to animals, since there are some medicines which it is necessary to administer in considerable quantities at intervals; but it is generally applicable in the case of such medicines as produce the best effect when administered for some time steadily and continuously in comparatively small quantity.

Condition-powders as administered by me to horses constitute a good example, as well as the most common one, of the application of my invention, which consists in providing a porous receptacle containing the medicine to be administered and suitable for attachment to the bit, whereby, when the bit is in the mouth of the animal, the medicine is gradually dissolved or taken up by the saliva and swallowed.

Figure 1:
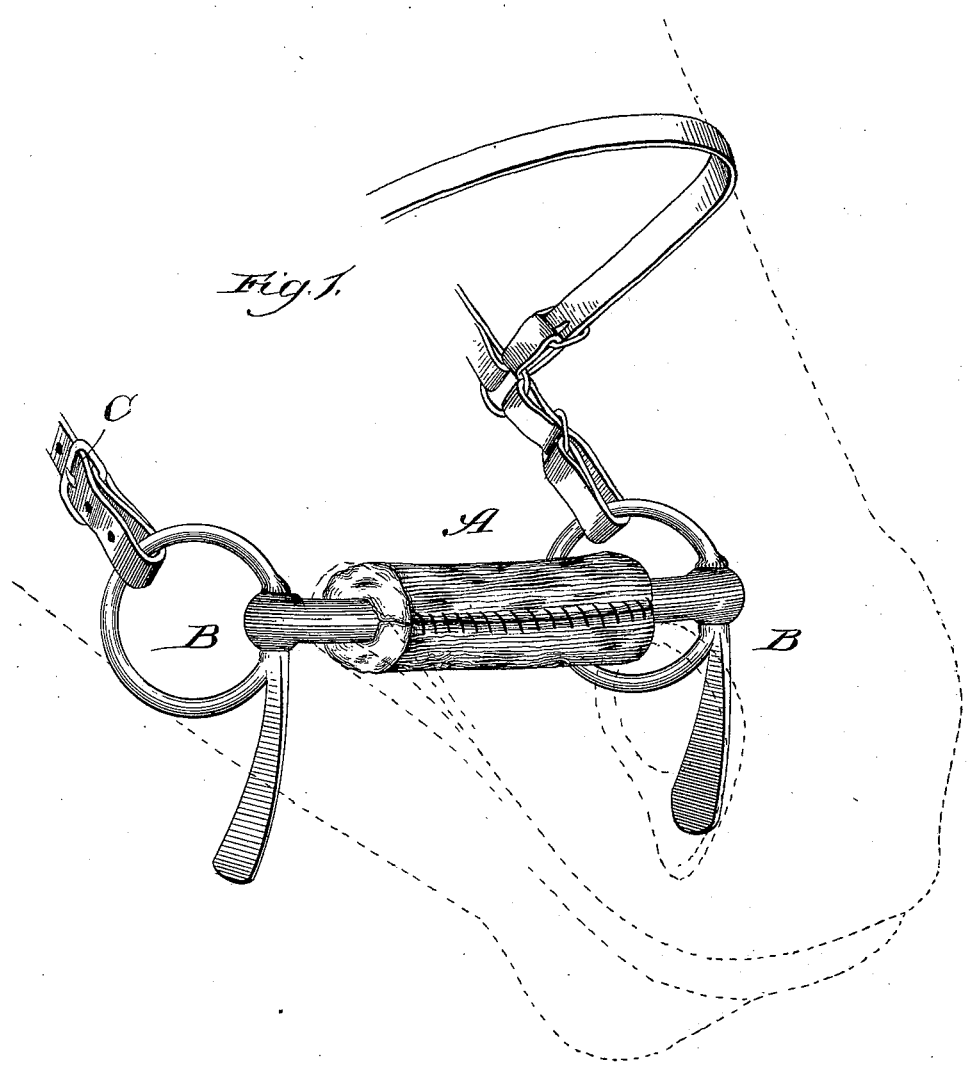
Figure 2:
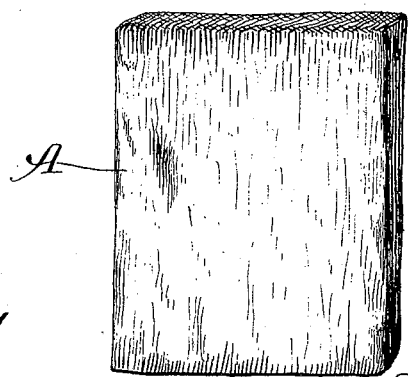

In the drawings, Figure 1 represents in perspective a porous envelope formed of fabric, containing the medicine to be administered, and sewed around a bit, which in turn is secured within the mouth of a horse in the ordinary way; and Fig. 2 is a perspective view of the sack containing the medicine ready for application.

A represents the porous envelope containing the medicine, B the bit to which the envelope is fastened, and C the bridle, halter, or analogous agent by which the bit is secured to the head of the animal, (indicated by dotted lines.) In this way porous envelopes containing medicine properly prepared and always ready for use can be kept on hand, and one of them when required easily secured in place within the mouth of the animal, so that it can neither be ejected nor swallowed. By making the filled envelopes of proper dimensions the animal is subjected to no discomfort by their application. Care should be taken not to make them so thick as to prevent the animal from closing its mouth readily.

What I claim as new, and desire to secure by Letters Patent, is—

As a new article of manufacture, a closed envelope formed of porous fabric containing veterinary medicine and of dimensions permitting it to be secured to a bit and inserted within the mouth of the animal to be treated, substantially as described.

PHILIP QUITMAN.

In presence of—
   J. W. DYRENFORTH,
   M. J. BOWERS.